United States Patent
Crespo Peña et al.

(10) Patent No.: US 10,953,624 B2
(45) Date of Patent: Mar. 23, 2021

(54) AIRCRAFT AIRFOIL HAVING A STITCHED TRAILING EDGE AND MANUFACTURING METHOD THEREOF

(71) Applicant: Airbus Operations, S.L., Getafe (ES)

(72) Inventors: Soledad Crespo Peña, Madrid (ES); Carlos García Nieto, Madrid (ES); Iker Vélez De Mendizabal Alonso, Madrid (ES); Enrique Guinaldo Fernández, Madrid (ES)

(73) Assignee: Airbus Operations, S.L.

( * ) Notice: Subject to any disclaimer, the term of this patent is extended or adjusted under 35 U.S.C. 154(b) by 782 days.

(21) Appl. No.: 15/438,896

(22) Filed: Feb. 22, 2017

(65) Prior Publication Data

US 2017/0246833 A1    Aug. 31, 2017

(30) Foreign Application Priority Data

Feb. 29, 2016    (EP) .................................... 16382084

(51) Int. Cl.
*B32B 5/02* (2006.01)
*B64C 1/00* (2006.01)
(Continued)

(52) U.S. Cl.
CPC .............. *B32B 5/028* (2013.01); *B29C 70/24* (2013.01); *B32B 37/14* (2013.01); *B64C 1/00* (2013.01);
(Continued)

(58) Field of Classification Search
CPC ... B32B 5/028; B32B 37/14; B32B 2038/008; B64C 1/00; B64C 9/00; B64C 2001/0072
(Continued)

(56) References Cited

U.S. PATENT DOCUMENTS 3,923,421 A * 12/1975 Carter ................... B64C 27/006
                                                          416/224
4,619,553 A * 10/1986 Fischer ..................... B32B 5/26
                                                          405/63
(Continued)

FOREIGN PATENT DOCUMENTS

WO    2007/071384 A2    6/2007
WO    2010/070185 A2    6/2010

OTHER PUBLICATIONS

Search Report (EP 16382084.8) dated Aug. 4, 2016.

*Primary Examiner* — Bret Hayes
(74) *Attorney, Agent, or Firm* — Lerner, David, Littenberg, Krumholz & Mentlik, LLP

(57) ABSTRACT

A configuration and manufacturing method for a trailing edge of an aircraft airfoil, such as a control surface or a lifting surface is described. The trailing edge is formed and configured by upper and lower composite covers, which are stitched to each other with a metallic wire, such as the metallic wire is electrically in contact with upper and lower metallic meshes to provide electrical continuity between meshes. According to a method, upper and lower covers configuring the trailing edge, are stitched with the metallic wire before curing the covers, so that the metallic wire gets embedded within the composite material. A trailing edge for an aircraft airfoil, which is easy to manufacture and that at the same time fulfills aerodynamic, mechanical and electrical conductivity requirements is described.

15 Claims, 5 Drawing Sheets

(51) Int. Cl.
  *B32B 37/14* (2006.01)
  *B64C 9/00* (2006.01)
  *B64C 3/20* (2006.01)
  *B64D 45/02* (2006.01)
  *B29C 70/24* (2006.01)
  *B32B 5/06* (2006.01)
  *B32B 15/02* (2006.01)
  *B29L 31/30* (2006.01)
  *B32B 38/00* (2006.01)

(52) U.S. Cl.
  CPC ............... *B64C 3/20* (2013.01); *B64C 9/00* (2013.01); *B64D 45/02* (2013.01); *B29L 2031/3085* (2013.01); *B32B 5/02* (2013.01); *B32B 5/06* (2013.01); *B32B 15/02* (2013.01); *B32B 2038/008* (2013.01); *B32B 2260/021* (2013.01); *B32B 2260/046* (2013.01); *B32B 2262/106* (2013.01); *B32B 2305/076* (2013.01); *B32B 2305/72* (2013.01); *B32B 2605/18* (2013.01); *B64C 2001/0072* (2013.01); *D05D 2209/12* (2013.01); *Y02T 50/40* (2013.01)

(58) Field of Classification Search
  USPC ....................................................... 244/123.1
  See application file for complete search history.

(56) References Cited

U.S. PATENT DOCUMENTS

| | | |
|---|---|---|
| 6,319,346 B1 | 11/2001 | Clark et al. |
| 2002/0096506 A1* | 7/2002 | Moreland ............. B64D 15/12 |
| | | 219/202 |
| 2004/0058122 A1 | 3/2004 | Tsotsis |
| 2005/0224653 A1* | 10/2005 | Miener .................. H01R 4/646 |
| | | 244/129.1 |
| 2009/0001223 A1* | 1/2009 | Grohmann ............... B64C 3/48 |
| | | 244/213 |
| 2010/0015394 A1* | 1/2010 | Morrison ............... B28B 1/002 |
| | | 428/137 |
| 2010/0021682 A1 | 1/2010 | Liang et al. |
| 2010/0155528 A1 | 6/2010 | Balsa Gonzalez et al. |
| 2013/0216767 A1 | 8/2013 | Cinquin |
| 2014/0339370 A1 | 11/2014 | De Gregorio Hurtado et al. |
| 2015/0344125 A1 | 12/2015 | Petiot et al. |
| 2016/0312616 A1* | 10/2016 | Notarianni ............. B29C 70/48 |
| 2017/0368769 A1* | 12/2017 | Baumbach ........... B29C 70/885 |
| 2017/0368782 A1* | 12/2017 | Abisror .................. B32B 37/12 |

\* cited by examiner

AIRCRAFT AIRFOIL HAVING A STITCHED TRAILING EDGE AND MANUFACTURING METHOD THEREOF

FIELD OF THE INVENTION

The present invention refers in general to the manufacturing method and configuration of trailing edge for an aircraft airfoil, such as a control surface or a lifting surface.

An aspect of the present invention relates to a trailing edge for an aircraft airfoil, which is easy to manufacture and that at the same time fulfills the aerodynamic, mechanical and electrical conductivity requirements.

The invention can be applied in the manufacture of aircraft lifting surfaces and/or aircraft control surfaces such as: wings, horizontal tail planes (HTP), vertical tail planes (VTP), ailerons, flaps, elevators and rudders.

BACKGROUND OF THE INVENTION

As shown in FIG. 1, the trailing edge (1) of an airfoil (2) like an aircraft lifting or control surface, is the rearmost edge of the airfoil (2). This zone, usually sharp, is critical as it has a strong influence on the drag created by the aerodynamic surface.

In addition to the aerodynamic requirements, the trailing edge has additional requirements derived from lightning strike events. Due to the particular location of the trailing edge, there is a high probability of a lightning flash being swept from the initial lighting strike zone. Therefore, following international directive: Aircraft Lightning Zoning ED-91 N/A 27/06/2006 N/A EUROCAE, the trailing edge has to work as a conductive path for lightning strike currents.

The combination of these two requirements, together with the need for a quick and simple installation, has resulted in designs based mainly on U-shaped metallic clips (3) (FIG. 2A) made of aluminum or corrosion resistant steel configuring the trailing edge, which are fitted to upper and lower covers (4,5) joining these two elements. For that, the upper and lower covers, are typically joined with the metallic clip by means of one or two rows of fasteners (11) (FIG. 2B), and are configured such as the thickness of the upper skin and of the lower skin progressively decrease towards the trailing edge, in order to achieve the desired aerodynamic profile. The international patent publication WO 2010/070185 A1 (FIG. 2A) is an example of this conventional clip type solution.

However, at the interface area between the metallic clip and upper and lower covers, a gap or recess, is created affecting negatively to the aerodynamic performance of the trailing edge area. One of the known solutions to avoid that problem, consists of filing that gap with a filling material, as to obtain a continuous and smooth surface at the connection zone between the covers and the metallic clip to achieve an optimum aerodynamic performance of the surface. The U.S. Patent application US-20140339370, is an example of the above-described solution.

However, the problem of using this filling material is that, during the aircraft service life, this filler gets cracked, which also causes the corresponding cracking and subsequent flaking of the external surface paint, which results in complaints of the airlines operating the aircraft because of its highly deteriorated appearance.

Another known solution is to fill the gap zone by means of a strip of sealant material. This solution does not maintain the continuity between the connecting clips and the claddings, and thus the visual appearance of the outer surface is not as good as desired. Moreover, this solution involves an aerodynamic penalty which increases parasitic resistance of the aircraft.

BRIEF SUMMARY OF THE INVENTION

The present invention relates to the configuration and manufacturing method of the trailing edge of an aircraft airfoil.

According to an aspect of the invention, an aircraft airfoil has a trailing edge formed by upper and lower covers obtained from a composite material, such upper and lower covers are arranged on top of each other and configure together the trailing edge aerodynamic profile. For protecting the aircraft against lighting strikes, conventionally upper and lower metallic meshes are applied respectively on the upper and lower covers.

According to an embodiment of the invention, at least within an area of the trailing edge, the upper and lower covers are sewn or stitched to each other with a metallic wire, such as the metallic wire is electrically in contact with the upper and lower metallic meshes in case there are any to provide electrical continuity between upper and lower metallic meshes.

In order to provide electrical continuity between the upper and lower skin covers, the trailing edge stitching process is performed after applying the metallic meshes and before curing the composite skin covers, and so that the metallic wire gets in contact with the metallic meshes were present in the component.

One of the advantages of the invention, is that the trailing edge can be obtained in one-shot process, which, unlike prior art solutions based on metallic clips, does not require any subsequent assembly process.

Another advantage from the aerodynamic point of view, is that an aspect of the invention provides better aerodynamic performance than current solutions, as surfaces resulting from the upper and lower skins integration are smoother and cleaner, without gaps, thus resulting in less air disturbances and less drag penalty.

Another aspect of the invention, refers to a method for manufacturing an aircraft airfoil comprising the steps of, forming first and second laminates and applying first and second metallic meshes respectively on the required surface areas of the first and second laminates.

The first and second laminates are then assembled on top of each other to configure a trailing edge of the airfoil. Then, at least an area of the first and second laminates at the trailing edge, are stitched (sewn) with a metallic wire, such as the metallic wire gets in contact with first and second metallic meshes, where present, to provide electrical continuity between both meshes and/or to the trailing edge itself.

The first and second laminates are formed by laying-up a plurality of plies, either pre-peg composite plies or dry-fabric plies. The application of the first and second metallic meshes on the first and second laminates, and the subsequent step of stitching the first and second laminates, are carried out when the composite plies are still fresh (wet) in the case of pre-peg composite, or before injecting resin in the case of dry-fabric plies. This means, that the first and second laminates are cured once they have been stitched with the metallic wire, so that the metallic wire gets embedded (or integrated) within the composite material.

Some of the advantages of the invention can be summarized as follows:

provides a simple connection between upper and lower covers of the trailing edge, without clips so that no later assembly process after curing is required, possibility of one-shot manufacturing process, avoids gaps or steps on skin surfaces, less air disturbances in trailing edge avoids the use of rivets, thus saving weight and manufacturing time comply with all requirements both aerodynamic and electrical continuity

BRIEF DESCRIPTION OF THE DRAWINGS

Preferred embodiments of the invention, are henceforth described with reference to the accompanying drawings, wherein.

DETAILED DESCRIPTION

Figure 4:
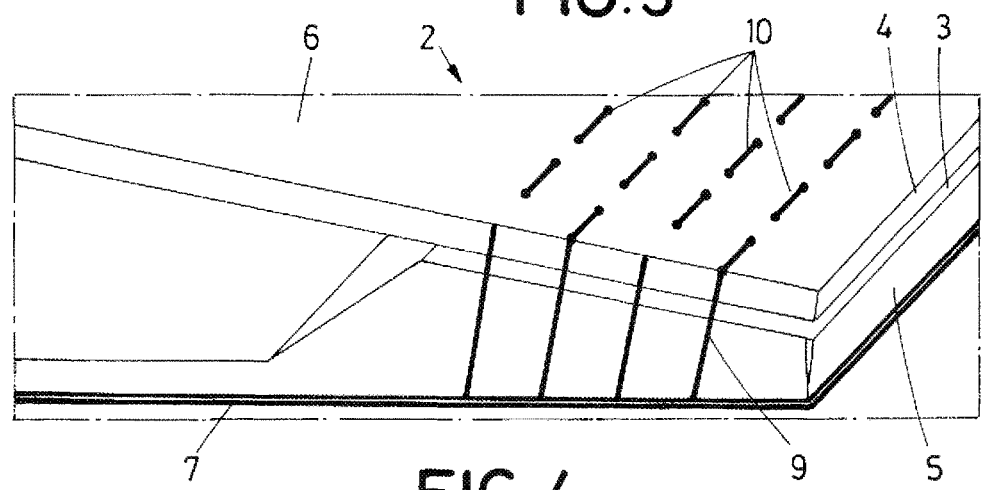
FIG. 4 shows a schematic representation in perspective view, of an exemplary embodiment of a trailing edge according to the invention.

FIG. 4 shows schematically an aircraft airfoil (2) comprising upper and lower covers (4,5) obtained from a composite material. The trailing edge (3) of the airfoil (2) is formed by the same upper and lower covers (4,5) of the airfoil, which are arranged on top of each other at the trailing edge area.

Conventionally, the airfoil further comprises upper and lower metallic meshes (6,7) typically made of bronze, which are respectively applied on the upper and lower covers (4,5). According to the invention, upper and lower covers (4,5) are stitched to each other with a metallic wire (9), such as the metallic wire is electrically in contact with the upper and lower metallic meshes (6,7), where present, to provide electrical continuity between meshes and/or to the trailing edge itself.

Figure 5:
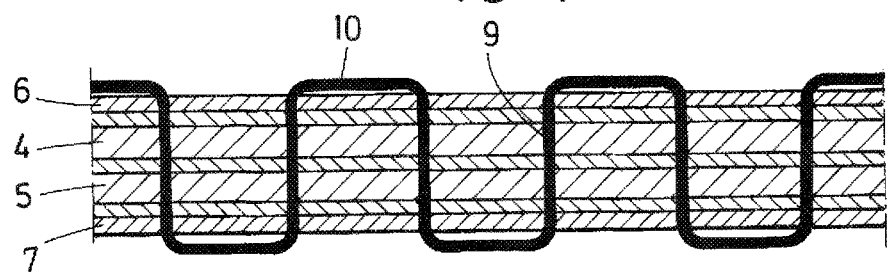
FIG. 5 shows a schematic representation in a cross-sectional view, of an exemplary embodiment of the invention.

FIG. 5 shows more clearly how a metallic wire (9) is stitched forming a stitching line (10) running alternatively on the upper and lower metallic meshes (6,7), and passing through upper and lower covers (4,5), defining a meander pattern. Alternatively, other stitching patterns can be used in the present invention.

There are as many stitching lines (10) as required to obtain the desired attachment strength between upper and lower covers (4,5), and to obtain the required electric conductivity between upper and lower meshes (6,7).

Furthermore, the stitching or seams lines (10) can be applied in several directions and patterns. For example, the stitching lines (10) are applied in multiple span-wise and directions as shown in FIG. 4, and/or in multiple chord directions (not shown).

Figure 1:
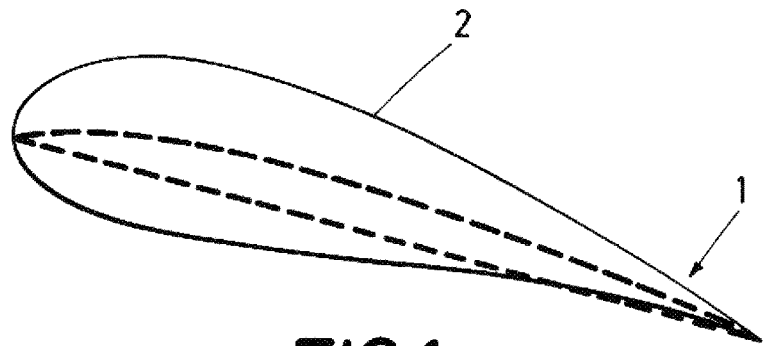
FIG. 1 shows in a cross-sectional view, the location of the trailing edge of a generic aircraft airfoil, according to the prior-art.
Figure 2A:
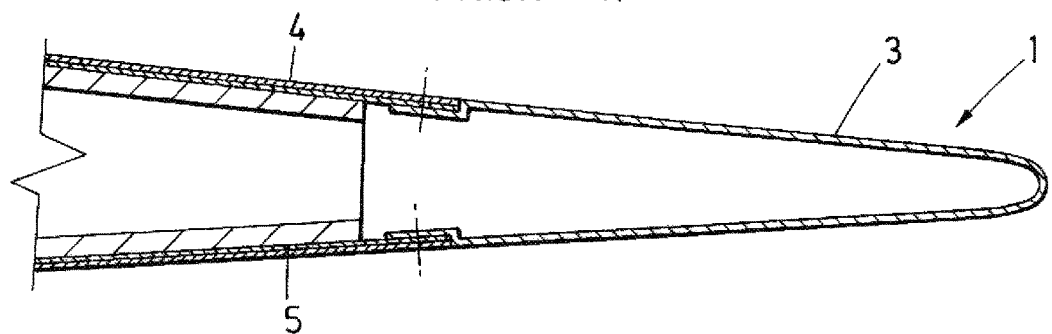
FIGS. 2A-2B show cross-sectional views of two prior-art trailing edge configurations based on clips.
Figure 2B:
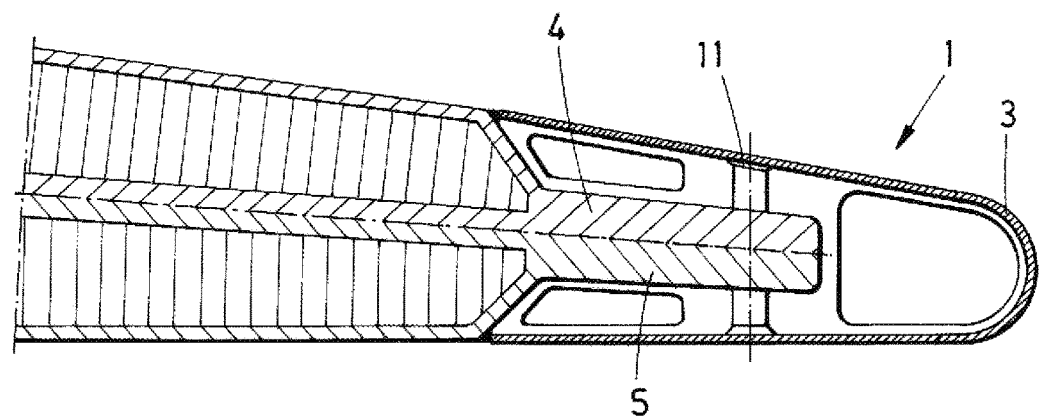
Figure 3:
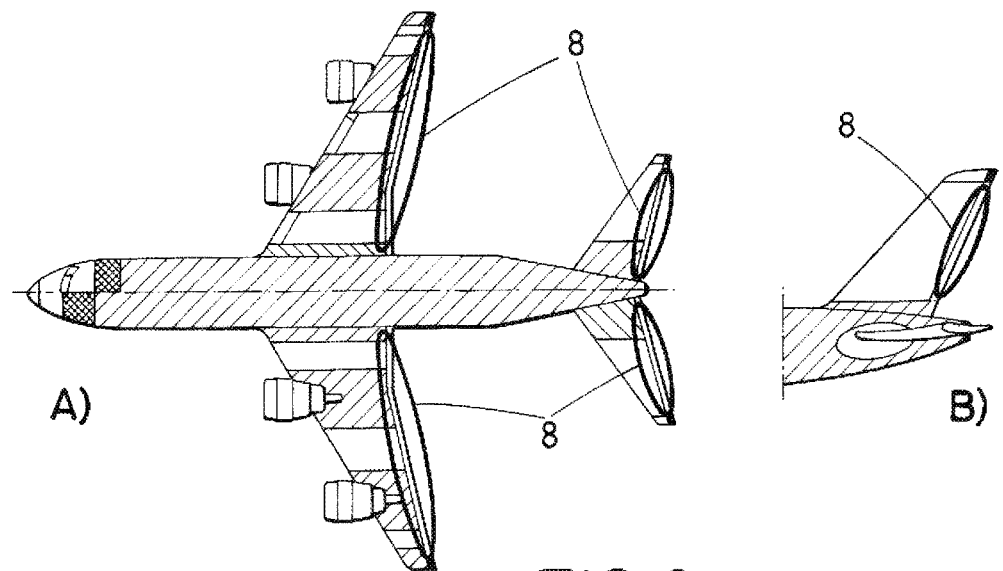
FIG. 3 shows in drawing (A) a top plan view, and in drawing (B) a side view of an aircraft of the prior art, wherein the trailing edges wherein the invention can be applied, are encircled.

As shown in FIG. 3 invention application areas (8) are: a trailing edge is configured and formed by the upper and lower skin covers of flaps, ailerons, elevators and rudders skin covers, these covers are made of a composite material and are stitched or sewn to each other with a metallic wire.

Figure 6:
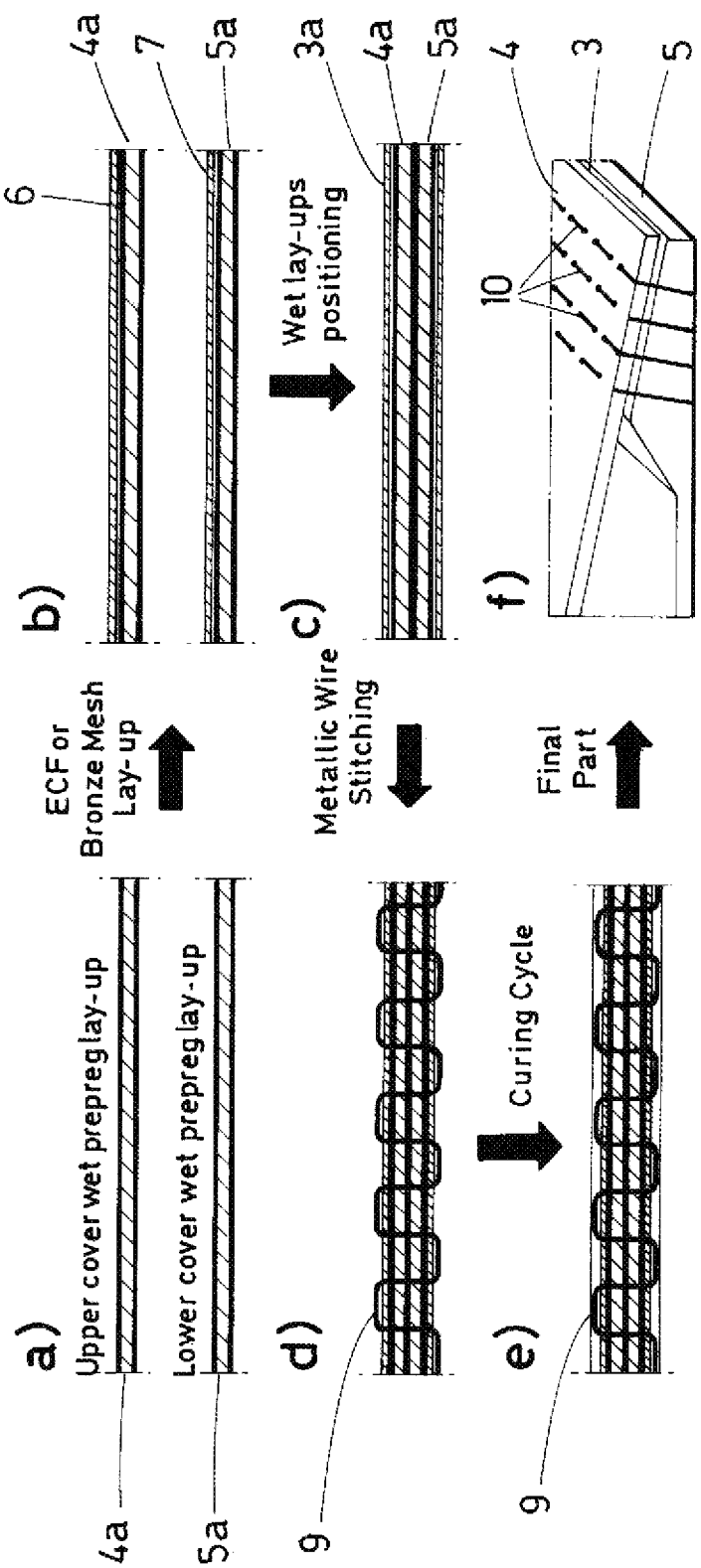
FIG. 6 shows a sequence of manufacturing steps according to a preferred embodiment of the method of the invention, using pre-peg composites.

FIG. 6 shows a preferred realization of the method of the invention for manufacturing an aircraft airfoil trailing edge, wherein first and second laminates (4a,5a) are formed by laying up a plurality of pre-peg composite plies (drawing (a)), preferably Carbon Fiber Reinforced Plastics (CFRP). Then, first and second metallic meshes (6,7) are applied (drawing (b)), respectively on a surface of the first and second laminates (4a,5a), where required.

First and second laminates (4a,5a) are assembled on top of each other to configure a trailing edge area (3a) of the airfoil (drawing (c)), and subsequently the first and second laminates (4a,5a) (still un-cured), are sewn together with at least one metallic wire (9) (drawing (d)), such as the metallic wire (9) gets in contact with first and second metallic meshes, where present, to provide electrical continuity between both meshes and/or to the trailing edge itself. Finally, the assembly is cured (drawing (e)) to obtain a trailing edge (3), for example as the one shown in FIG. 4.

Figure 7:
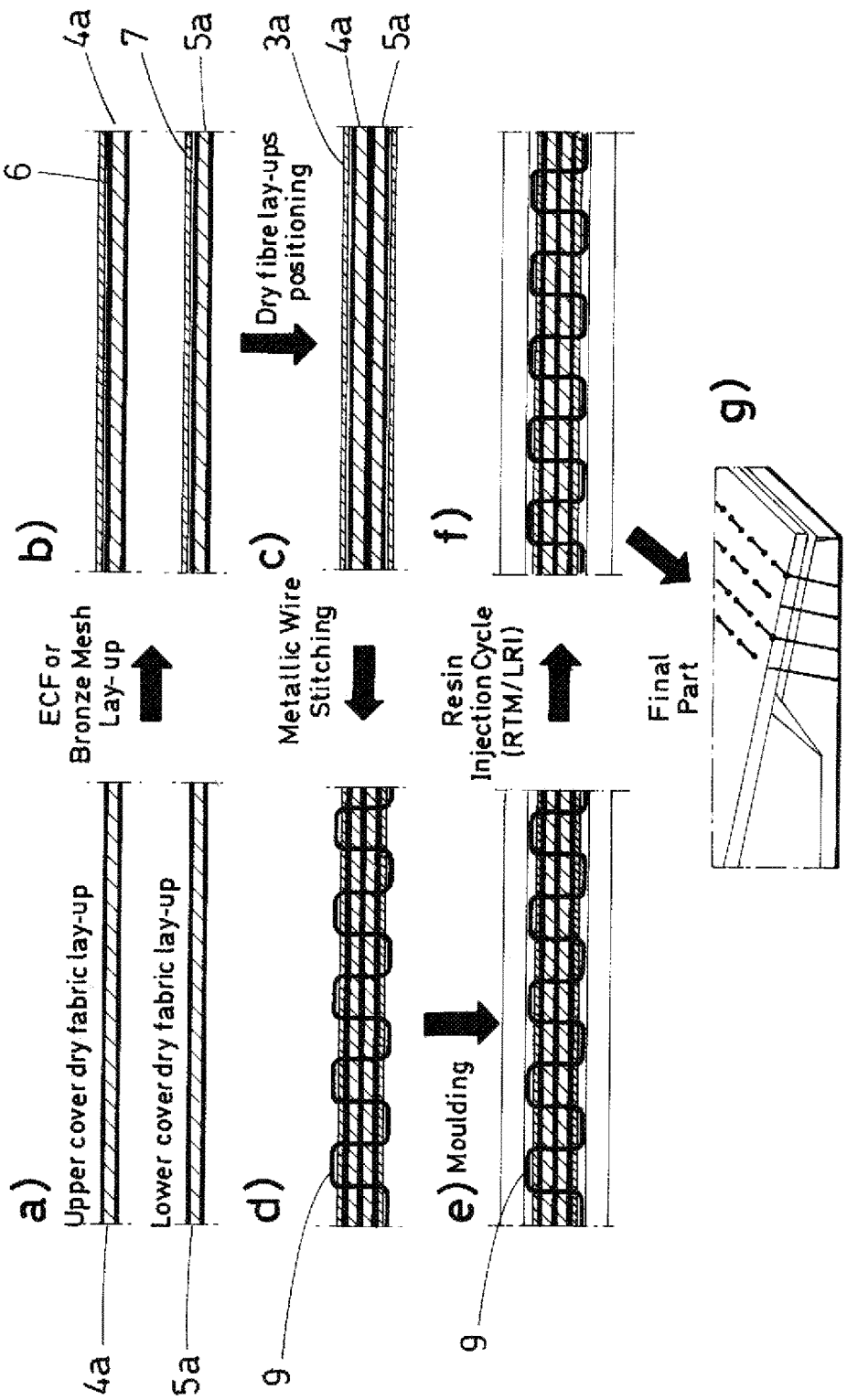
FIG. 7 shows a sequence of manufacturing steps according to a preferred embodiment of the method of the invention, using dry-fabric composites.

The alternative manufacturing method shown in FIG. 7, is similar to the one previously described, but using dry-fabric plies instead of pre-pegs. Therefore, in this case, first and second laminates (4a,5a) are formed by laying up a plurality of dry-fabric plies (drawing (a)), on which first and second metallic meshes (6,7) are applied (drawing (b)). The laminates (4a,5a) are assembled on top of each other to configure a trailing edge of the airfoil (drawing (c)), and subsequently they are sewn together with at least one metallic wire (9) (drawing (d)), such as the metallic wire gets in contact with first and second metallic meshes, where present.

The assembly is then placed inside a mold ((drawing (e)), wherein it is compressed and a resin is transferred into the dry-fabric plies, either by means of a Resin Transfer Moulding process, or by means of a Liquid Resin Infusion process. Finally, the assembly is cured (drawing (f)) to obtain a trailing edge (3) (drawing (g)), for example as the one shown in FIG. 4.

It should be noted that in addition to the bonding obtained by co-curing upper and lower covers together, the metallic wire (9) provides structural connection between the covers.

Figure 8:
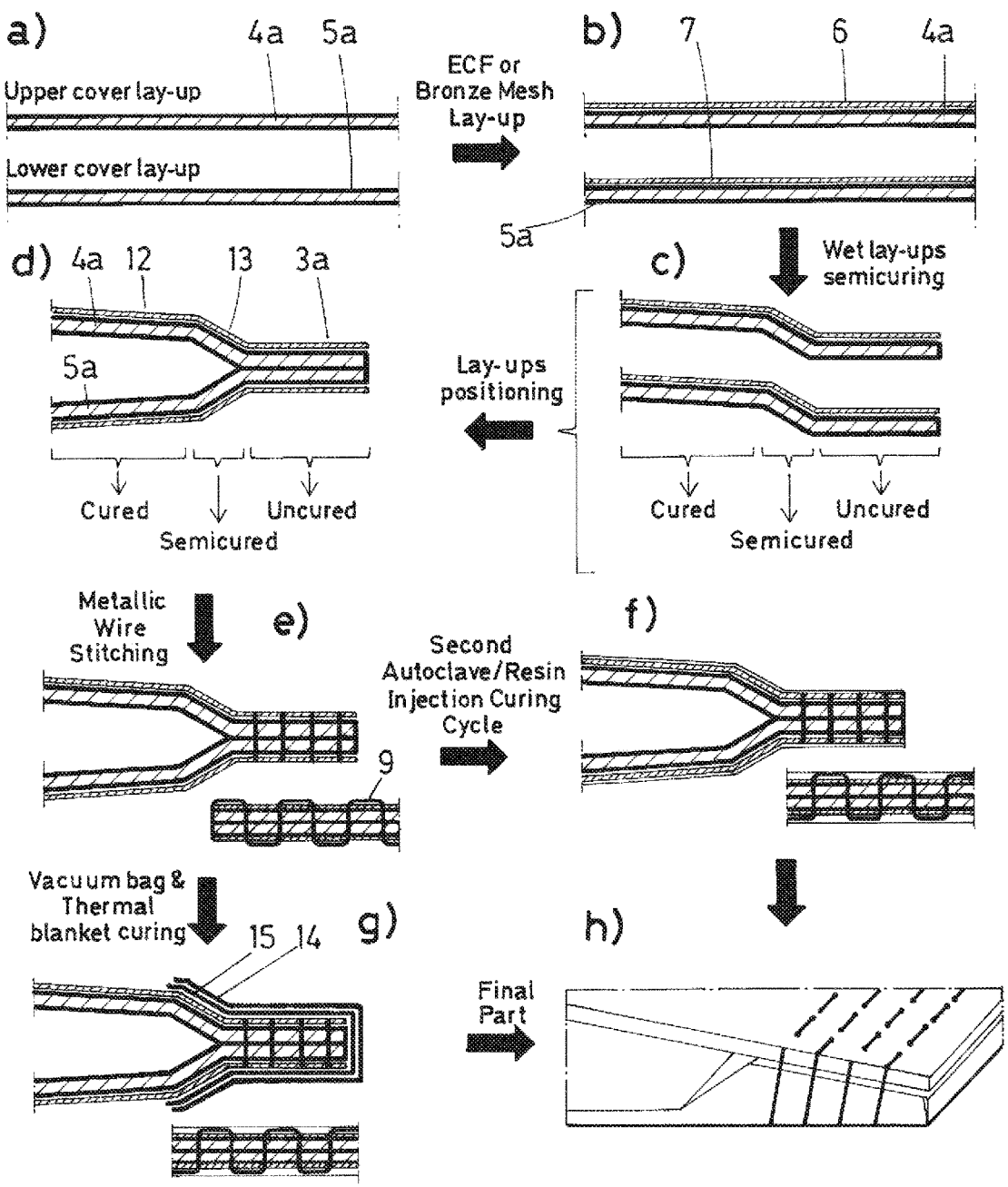
FIG. 8 shows a sequence of manufacturing steps according to a preferred embodiment of the method of the invention, using semi-cured covers.

In the alternative manufacturing method shown in FIG. 8, instead of co-curing upper and lower laminates in one-shot, these laminates are cured at two different stages. First, first and second laminates (4a,5a) are formed by a plurality of pre-peg composite plies (drawing (a)), on which first and second metallic meshes (6,7) are applied (drawing (b)).

The first and second laminates (4a,5a) once cured would form the trailing edge of the airfoil, but also upper and lower skin covers of the airfoil. In the method of FIG. 8, first and second laminates (4a,5a) are semi-cured before their assembly. In a first curing cycle, the forward areas (12) of the upper and lower laminates (4a,5a) are cured (drawing (c)), while the trailing edge areas (3a) are maintained in an un-cured state, and wherein intermediate areas of the upper and lower covers between the inner areas and the trailing edge areas, are semi-cured.

Then the laminates (4a,5a) are assembled on top of each other to configure a trailing edge of the airfoil (drawing (d)), and forward and intermediate areas (12,13) wherein they are separated. The trailing edge areas (3a) are then stitched with at least one metallic wire (9) (drawing (e)), and finally after the stitching process the trailing edge area (3a) is cured in a second curing cycle, which can be carried out by an autoclave (drawing (f)), or by means of the local application of heat and pressure by means of a thermal blanket (14) and a vacuum bag (15) as shown in (drawing (g)), to obtain a trailing edge (drawing (h)).

For the metallic wire (9) a large variety of metals can be used, such as: cooper, aluminum, steel, etc., or even metal alloys suitable for this application. As per the mechanical properties and diameter of the metallic wire, these would be chosen for each particular application, to meet both mechanical and lighting strike requirements.

Other preferred embodiments of the present invention are described in the appended dependent claims and the multiple combinations of those claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft airfoil comprising:
upper and lower covers obtained from a composite material,
wherein a trailing edge of the airfoil is formed by said upper and lower covers arranged on top of each other at the trailing edge, said upper and lower covers defining a rearmost edge of the aircraft airfoil, and
wherein the upper and lower covers are stitched to each other with at least one metallic wire.

2. The aircraft airfoil according to claim 1, further comprising upper and lower metallic meshes respectively applied on the upper and lower covers, and wherein the metallic wire is electrically in contact with the upper and lower metallic meshes to provide electrical continuity between upper and lower metallic meshes.

3. The aircraft airfoil according to claim 1, wherein the metallic wire is embedded within the composite material.

4. The aircraft airfoil according to claim 1, further comprising a plurality of stitching lines substantially extending in a span-wise direction.

5. The aircraft airfoil according to claim 1, further comprising a plurality of stitching lines substantially extending in a chord direction.

6. The aircraft airfoil according to claim 1, selected from the group comprising: an aileron, a flap, an elevator, or a rudder.

7. The aircraft airfoil according to claim 1, wherein the composite material is carbon fiber reinforced plastic.

8. A method for manufacturing an aircraft airfoil comprising:
forming first and second laminates and applying first and second metallic meshes respectively on a surface of the first and second laminates;
assembling the first and second laminates on top of each other to configure a trailing edge of the airfoil such that said first and second laminates define a rearmost edge of the aircraft airfoil; and
stitching the first and second laminates with a metallic wire, such that the metallic wire contacts the first and second metallic meshes where present to provide electrical continuity between both meshes.

9. The method according to claim 8, wherein the first and second laminates are formed by plies of pre-peg composite, and
wherein the application of the first and second metallic meshes on the first and second laminates, and the stitching the first and second laminates, are carried out when the composite plies are still fresh.

10. The method according to claim 9, wherein the first and second laminates are cured after the stitching so that the metallic wire is embedded within the plies of pre-peg composite.

11. The method according to claim 9, wherein the first and second laminates are respectively upper and lower skins of an aircraft airfoil, and
wherein forward areas of the first and second laminates are cured in a first curing cycle, while areas of the trailing edge are maintained in an un-cured state, and
wherein intermediate areas of the first and second laminates between the forward areas and the areas of the trailing edge are semi-cured.

12. The method according to claim 11, wherein the intermediate areas and the areas of the trailing edge are cured in a second curing cycle.

13. The method according to claim 8, wherein the first and second laminates are formed by stacked dry-fabric plies, and
wherein the application of the first and second metallic meshes on the first and second laminates, and the stitching the first and second laminates, are carried out when the stacked dry-fabric plies are still dry.

14. The method according to claim 13, further comprising:
applying resin to the stacked dry-fabric plies, by a Resin Transfer Moulding process, or by a Liquid Resin Infusion process.

15. The method according to claim 14, further comprising:
curing the laminates, so that the metallic wire is embedded within the stacked dry-fabric plies.

* * * * *